United States Patent
Mohajeri (10) Patent No.: US 12,395,831 B2
(45) Date of Patent: Aug. 19, 2025

(54) DYNAMICALLY GENERATING APPLICATION FUNCTION-SPECIFIC USER ENDPOINT IDENTIFIERS

(71) Applicant: AT&T Intellectual Property I, L.P., Atlanta, GA (US)

(72) Inventor: Shahram Mohajeri, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 459 days.

(21) Appl. No.: 18/059,416

(22) Filed: Nov. 28, 2022

(65) Prior Publication Data

US 2024/0179510 A1 May 30, 2024

(51) Int. Cl.
*H04W 8/18* (2009.01)
*H04W 8/08* (2009.01)

(52) U.S. Cl.
CPC ............. *H04W 8/183* (2013.01); *H04W 8/08* (2013.01)

(58) Field of Classification Search
CPC ................................ H04W 8/183; H04W 8/08
USPC .................. 455/550.1, 418, 423, 435.1, 410
See application file for complete search history.

(56) References Cited

U.S. PATENT DOCUMENTS

| | | | | |
|---|---|---|---|---|
| 12,273,705 | B2* | 4/2025 | Gundavelli | H04W 12/03 |
| 2022/0046752 | A1* | 2/2022 | Lee | H04W 76/40 |
| 2023/0051733 | A1* | 2/2023 | Shah | H04W 72/56 |
| 2023/0164641 | A1* | 5/2023 | Purkayastha | H04W 36/0022 370/331 |

OTHER PUBLICATIONS

Mohajeri et al., "Internet Protocol Version 4-to-Version 6 Redirect for Application Function-Specific User Endpoint Identifiers," U.S. Appl. No. 18/059,418, filed Nov. 28, 2022, 30 pages.

* cited by examiner

*Primary Examiner* — Nghi H Ly (57) ABSTRACT

In one example, the present disclosure describes a device, computer-readable medium, and method for dynamically generating an application function-specific user endpoint identifier. For instance, in one example, a method performed by a processing system including at least one processor includes receiving, from a network exposure function of a communications network, a request for an application function-specific user endpoint identifier that is unique to a user endpoint device and an application function residing externally to the communications network, querying a unified data repository for the application function-specific user endpoint identifier, determining, based on a response from the unified data repository, whether the application function-specific user endpoint identifier exists in the unified data repository, dynamically generating the application function-specific user endpoint identifier, and forwarding the application function-specific user identifier, as dynamically generated, to the network exposure function.

20 Claims, 5 Drawing Sheets

DYNAMICALLY GENERATING APPLICATION FUNCTION-SPECIFIC USER ENDPOINT IDENTIFIERS

The present disclosure relates generally to digital privacy, and relates more particularly to devices, non-transitory computer-readable media, and methods for dynamically generating an application function-specific user endpoint identifier (UEId).

BACKGROUND

In the Third Generation Partnership Project (3GPP), each subscriber identity module (SIM) card may be allocated a unique identifier or UEId. For instance, in generations up to fourth generation (4G) mobile networks, the UEId may comprise an international mobile subscriber identity (IMSI); in fifth generation (5G) mobile networks, the UEId may comprise a subscription permanent identifier (SUPI) or a generic public subscription identifier (GPSI). An application function-specific UEId is like a GPSI in the form of an External Identifier (as opposed to a phone number, or MSISDN, form) that is generated for a device specifically for use with a particular application function. The use of different AF-specific UEIds in the form of External Identifiers (i.e., opaque identifiers) for different application functions has two main benefits: (1) AF-specific UEIds allows users to, if need be, avoid divulging their phone numbers (which are considered privacy-sensitive pieces of information) to application functions (i.e., such that the users are identified by the application functions in an anonymous manner); and (2) AF-specific UEIds prevent correlation and tracking of UEIds (and, thus, users) across applications.

SUMMARY

In one example, the present disclosure describes a device, computer-readable medium, and method for dynamically generating an application function-specific user endpoint identifier. For instance, in one example, a method performed by a processing system including at least one processor includes receiving, from a network exposure function of a communications network, a request for an application function-specific user endpoint identifier that is unique to a user endpoint device and an application function residing externally to the communications network, querying a unified data repository for the application function-specific user endpoint identifier, determining, based on a response from the unified data repository, whether the application function-specific user endpoint identifier exists in the unified data repository, dynamically generating the application function-specific user endpoint identifier, and forwarding the application function-specific user identifier, as dynamically generated, to the network exposure function.

In another example, a non-transitory computer-readable medium stores instructions which, when executed by a processing system including at least one processor, cause the processing system to perform operations. The operations include receiving, from a network exposure function of a communications network, a request for an application function-specific user endpoint identifier that is unique to a user endpoint device and an application function residing externally to the communications network, querying a unified data repository for the application function-specific user endpoint identifier, determining, based on a response from the unified data repository, whether the application function-specific user endpoint identifier exists in the unified data repository, dynamically generating the application function-specific user endpoint identifier, and forwarding the application function-specific user identifier, as dynamically generated, to the network exposure function.

In another example, a system includes a processing system including at least one processor and a non-transitory computer-readable medium storing instructions which, when executed by the processing system, cause the processing system to perform operations. The operations include receiving, from a network exposure function of a communications network, a request for an application function-specific user endpoint identifier that is unique to a user endpoint device and an application function residing externally to the communications network, querying a unified data repository for the application function-specific user endpoint identifier, determining, based on a response from the unified data repository, whether the application function-specific user endpoint identifier exists in the unified data repository, dynamically generating the application function-specific user endpoint identifier, and forwarding the application function-specific user identifier, as dynamically generated, to the network exposure function.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for dynamically generating an application function-specific user endpoint identifier (UEId). As discussed above, in the Third Generation Partnership Project (3GPP), each subscriber identity module (SIM) card may be allocated a unique identifier or UEId. For instance, in generations up to fourth generation (4G) mobile networks, the UEId may comprise an international mobile subscriber identity (IMSI); in fifth generation (5G) mobile networks, the UEId may comprise a subscription permanent identifier (SUPI) or a generic public subscription identifier (GPSI). An application function-specific UEId is like a GPSI in the form of an External Identifier (as opposed to a phone number, or MSISDN) that is generated for a device specifically for use with a particular application function. The use of different AF-specific UEIds in the form of External Identifiers (i.e., opaque identifiers) for different application functions has two main benefits: (1) AF-specific UEIds allows users to, if need be, avoid divulging their phone numbers (which are considered privacy-sensitive pieces of information) to application functions (i.e., such that the users are identified by the application functions in an anonymous manner); and (2) AF-specific UEIds prevent correlation and tracking of UEIds (and, thus, users) across applications.

Currently, to enable application function-specific UEIds, 3GPP has defined the Nnef_UEId_Get service operation (i.e., 3GPP 23.502). The Nnef_UEId_Get service operation is invoked by an application function (e.g., a social media application, a streaming media application, or the like), which sends a Nnef_UEId_Get request including the IP address of a user endpoint device to a network exposure function (NEF). The NEF authorizes the request and then sends a management discovery request to a binding support function (BSF). In response to the management discovery request, the BSF determines the subscription permanent identifier (SUPI) that corresponds to the IP address specified in the Nnef_UEId_Get request and returns the SUPI to the NEF. The NEF then sends the SUPI to a unified data management element (UDM), which uses the SUPI to query a unified data repository (UDR) for an application function-specific UEId corresponding to the SUPI and the AFId (the identity of the application function, which the NEF determined through the authorization step), which is ultimately returned to the application function via the UDM and the NEF.

The Nnef_UEId_Get service operation assumes that application function-specific UEIds have been provisioned in advance for a user endpoint. However, this is not always the case. For instance, the user endpoint may be a user's mobile phone, and the user may have just newly downloaded an application onto the mobile phone. If the newly downloaded application through its associated application function (which is an untrusted server residing outside of the mobile communications network) attempts to invoke the Nnef_UEId_Get service operation, an error will be generated, because there will be no application function-specific UEId defined in the UDR for the newly downloaded application on the mobile phone. Moreover, some users may delete application function-specific UEIds that have been provisioned in advance, for privacy reasons (e.g., to force a "forget me" effect). When the application functions associated with the deleted UEIds subsequently attempt to invoke the Nnef_UEId_Get service operation, errors will be generated.

Examples of the present disclosure provide an application function-specific UEId management function that can generate application function-specific UEIds on the fly for application functions and user endpoints. The disclosed approach circumvents the generation of errors when application function-specific UEIds are not provisioned in advance and/or when users have deleted previously generated application function-specific UEIds.

The disclosed management function may utilize GPSIs in the form of external identifiers (e.g., as defined by 3GPP) in order to uniquely and anonymously identify user endpoints. The GPSIs are specific to given application functions in order to prevent the user endpoints behavior from being tracked across application functions. These and other aspects of the present disclosure are discussed in further detail with reference to FIGS. 1-5, below.

Figure 1:
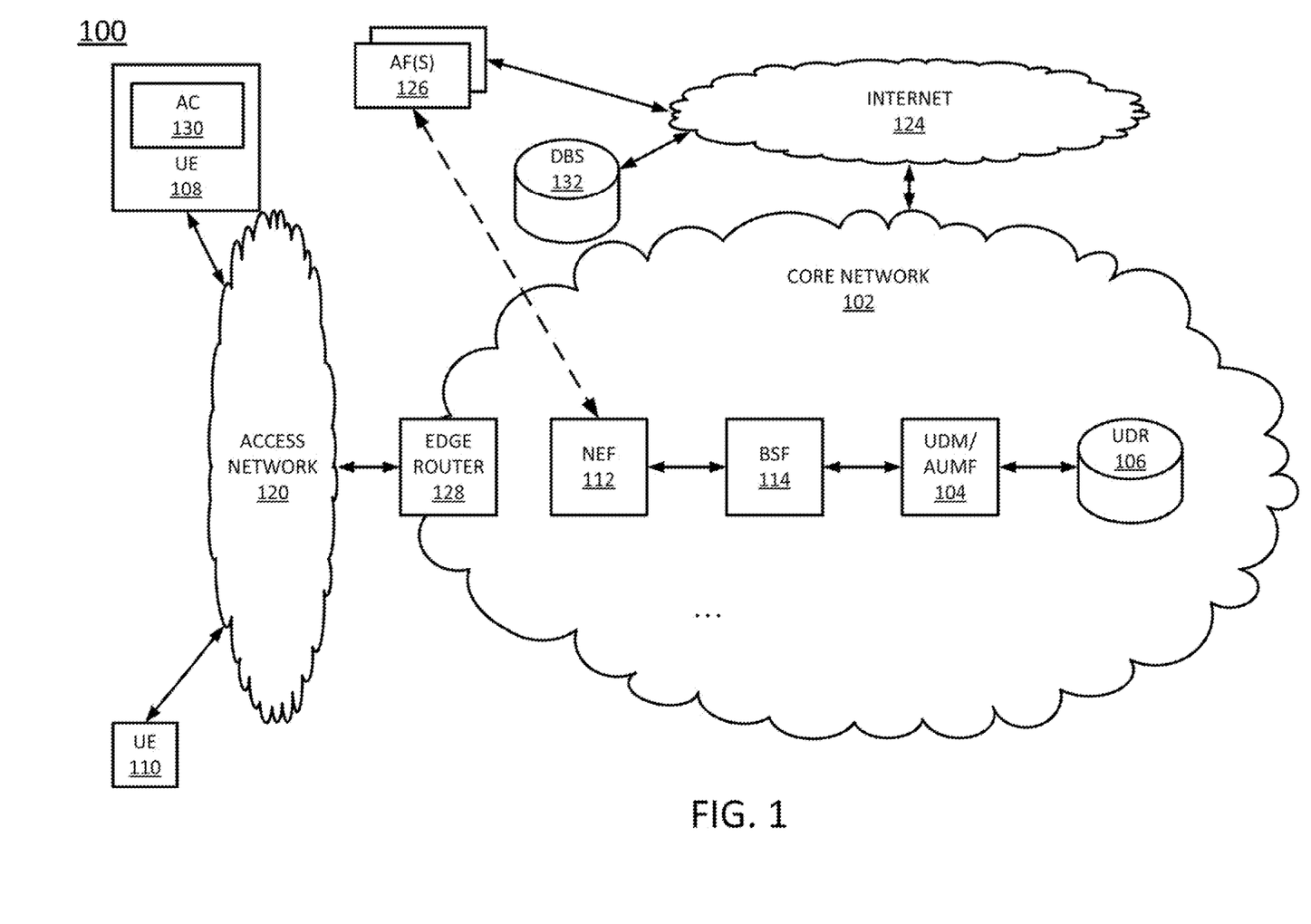
FIG. 1 illustrates an example system in which examples of the present disclosure for providing an application function-specific user endpoint identifier management function may operate.

To further aid in understanding the present disclosure, FIG. 1 illustrates an example system 100 in which examples of the present disclosure for dynamically generating an application function-specific user endpoint identifier (UEId) may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks such as access network 120 and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include a plurality of network elements, including at least a network exposure function (NEF) 112, a binding support function (BSF) 114, a unified data management (UDM) element/application function-specific UEId management function (AUMF) 104, and a unified data repository (UDR) 106. Although the NEF 112, BSF 114, UDM/AUMF 104, and UDR 106 are illustrated as separate elements in FIG. 1, in one example one or more of the NEF 112, BSF 114, UDM/AUMF 104, and UDR 106 may be integrated in a single element (e.g., a single application server or the like). For instance, a single application server may perform the functions of the NEF 112, BSF 114, and UDM/AUMF 104 and may communicate with the UDR 106. Additionally, the core network 102 may include a plurality of edge routers, including edge router 128. For ease of illustration, various additional elements of the core network 102 are omitted from FIG. 1.

In one example, the access network 120 may comprise a Digital Subscriber Line (DSL) network, a public switched telephone network (PSTN) access network, a broadband cable access network, a Local Area Network (LAN), a wireless access (e.g., an IEEE 802.11/Wi-Fi network and the like), a cellular access network, a 3rd party network, and the like. For example, the operator of the core network 102 may provide a cable television service, an IPTV service, a streaming service, or any other types of telecommunication services to subscribers via access network 120. In one example, the core network 102 may be operated by a telecommunication network service provider (e.g., an Internet service provider, or a service provider who provides Internet services in addition to other telecommunication services). The core network 102 and the access network 120 may be operated by different service providers, the same service provider or a combination thereof, or the access network 120 may be operated by an entity having core businesses that are not related to telecommunications services, e.g., corporate, governmental, or educational institution LANs, and the like.

In one example, the access network 120 may be in communication with one or more user endpoint devices 108 and 110. The access network 120 may transmit and receive communications between the user endpoint devices 108 and 110, between the user endpoint devices 108 and 110, the application function(s) (AF(s)) 126 (e.g., application server(s)), the NEF 112, other components of the core network 102, devices reachable via the Internet in general, and so forth. In one example, each of the user endpoint devices 108 and 110 may comprise any single device or combination of devices that may comprise a user endpoint device, such as computing system 500 depicted in FIG. 5, and may be configured as described below. For example, the user endpoint devices 108 and 110 may each comprise a mobile device, a cellular smart phone, a gaming console, a set top box, a laptop computer, a tablet computer, a desktop computer, an application server, a wearable device (e.g., a smart watch or fitness tracker), an augmented reality (AR)/ virtual reality (VR) headset, customer premises equipment (e.g., gateway devices), a bank or cluster of such devices, and the like.

In one example, any one of the user endpoint devices 108 and 110 may run an application client (AC), such as AC 130. The AC 130 may communicate with the AFs 126 or other application servers in the system 100 in order to provide a service to the user endpoint devices 108 and 110, as discussed in greater detail below.

In one example, one or more AFs 126 and one or more databases 132 may be accessible to user endpoint devices 108 and 110 via Internet 124 in general. The AF(s) 126 and DBs 132 may be associated with Internet software applications that may exchange data with the user endpoint devices 108 and 110 over the Internet 124. Thus, some of the AFs 126 and DBs 132 may host applications including video conferencing applications, extended reality (e.g., virtual reality, augmented reality, mixed reality, and the like) applications, streaming media applications, social networking applications, immersive gaming applications, and the like.

In accordance with the present disclosure, the NEF 112, BSF 114, UDM/AUMF 104, and UDR 106 may be collectively configured to provide one or more operations or functions in connection with examples of the present disclosure for dynamically generating an application function-specific user endpoint identifier (UEId), as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the NEF 112, BSF 114, and UDM/AUMF 104 may cooperate, as discussed in further detail below, to query the UDR 106 for application function-specific UEIds/ GPSIs and to dynamically generate an application function-specific UEId/GPSI for a user endpoint device 108 or 110 and application function 126 if an application function-specific UEId/GPSI for the user endpoint device 108 or 110 and application function 126 does not already exist. Thus one or more of the NEF 112, BSF 114, and UDM/AUMF 104 may comprise an individual application server. Alternatively, as discussed above, a single application server may perform the functions of two or more of the NEF 112, BSF 114, and UDM/AUMF 104.

The UDR 106 may store a plurality of application function-specific UEIds for user endpoint devices and application functions that have already been generated. In one example, the UDR 106 may comprise a physical storage device integrated with the NEF 112, BSF 114, and UDM/ AUMF 104 (e.g., a database server or a file server), or attached or coupled to the UDM/AUMF 104, in accordance with the present disclosure.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access network 120, and/or Internet 124 may comprise a content distribution network (CDN) having ingest servers, edge servers, and the like. Similarly, although only one access network 120 is shown, in other examples, access network 120 may comprise a plurality of different access networks that may interface with the core network 102 independently or in a chained manner. For example, UE devices 108 and 110 may communicate with the core network 102 via different access networks. Thus, these and other modifications are all contemplated within the scope of the present disclosure.

Figure 2:
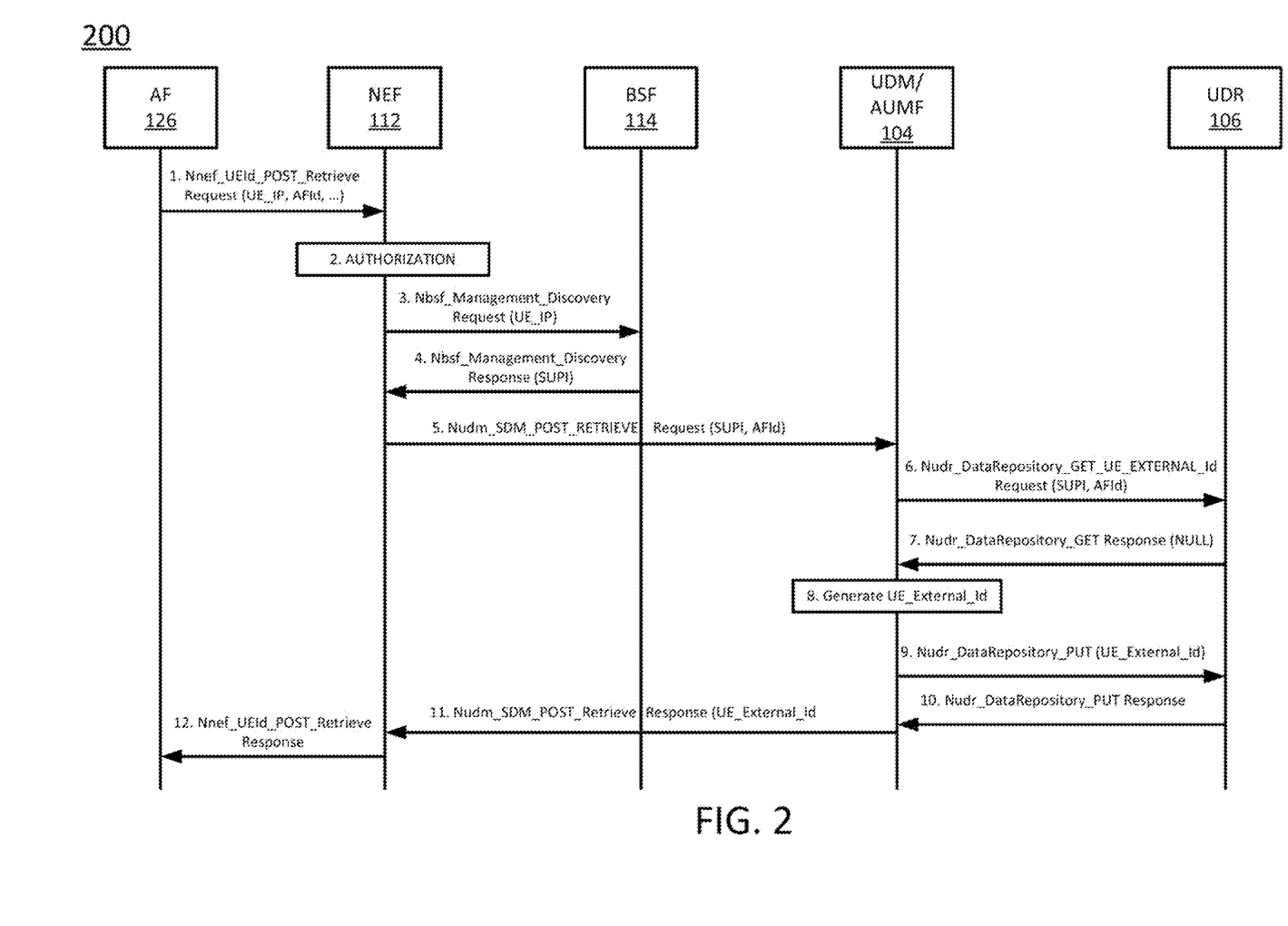
FIG. 2 illustrates a call flow diagram that shows a more detailed view of the operations of the network exposure function, a binding support function, a unified data management element/application function-specific user endpoint identifier management function, and a unified data repository of FIG. 1.

To further aid in understanding the present disclosure, FIG. 2 illustrates call flow diagram 200 that shows a more detailed view of the operations of the network exposure function (NEF) 112, the binding support function (BSF) 114, the unified data management (UDM) element/application function-specific UEId management function (AUMF) 104, and the unified data repository (UDR) 106 of FIG. 1. In particular, FIG. 2 illustrates the process by which an application function-specific UEId for a user endpoint device and application function 126 may be retrieved or generated dynamically.

As illustrated in FIG. 2, the AF 126 may first invoke a Nnef_UEId_POST_Retrieve service operation, by sending a Nnef_UEId_POST_Retrieve request message to the NEF 112. The Nnef_UEId_POST_Retrieve request message requests an application function-specific UEId which can be used by the AF 126 (which is untrusted and resides externally to the communications network) to refer to the user of the user endpoint device anonymously over application programming interface (API) interactions the AF 126 has with the communications network. As such, the Nnef_UEId_POST_Retrieve request message may include at least the IP address of the user endpoint device (UE_IP) and an identifier of the application function 126 (AF_Id).

The NEF 112 may authorize the Nnef_UEId_POST_Retrieve request and then send a management discovery request message (Nbsf_Management_Discovery Request) to the BSF 114. The management discovery request may request the subscription permanent identifier (SUPI) for the user endpoint device on which the AC 130 resides. As such, the management discovery request may include the IP address of the user endpoint device on which the AC 130 resides (UE_IP).

The BSF 114 may respond to the management discovery request message with a management discovery response message (Nbsf_Management_Discovery Response) that provides the SUPI that corresponds to the IP address of the user endpoint device on which the AC 130 resides (UE_IP). The management discovery response message may be sent back to the NEF 112.

Once the NEF 112 has acquired the SUPI for the user endpoint device on which the AC 130 resides, the NEF 112 may send a Nudm_SDM_POST_Retrieve request message to the UDM/AUMF 104. The Nudm_SDM_POST_Retrieve request message may include the SUPI for the user endpoint device on which the AC 130 resides and the identifier of the AF 126 (AF_Id). The Nudm_SDM_POST_Retrieve request message may request the application function-specific UEId (e.g., external identifier) for the AF 126 and the user endpoint device on which the AC 130 resides.

The UDM/AUMF 104 may next send a Nudr_DataRepository_GET_UE_External_Id request message to the UDR 106. The Nudr_DataRepository_GET_UE_External_Id request message may include the SUPI for the user endpoint device on which the AC 130 resides and the identifier of the AF 126 (AF_Id) and may ask the UDR 106 for the AF-specific UEId (e.g., external identifier) that corresponds to the SUPI and AF_Id.

If an AF-specific UEId corresponding to the SUPI and the AF_Id already exists in the UDR 106, then the UDR 106 may return the AF-specific UEId to the UDM/AUMF 104 in a Nudr_DataRepository_GET response message. However, if an AF-specific UEId corresponding to the SUPI and the AF_Id does not exist in the UDR 106, then the Nudr_DataRepository_GET response message may indicate to the UDM/AUMF 104 that the requested UDM/AUMF 104 does not exist (i.e., the request is NULL).

If a NULL response is received from the UDR 106, then the UDM/AUMF 104 may dynamically generate an application function-specific UEId for the AF 126 and the user endpoint device on which the AC 130 resides (UE_External_Id). The UDM/AUMF 104 may then store the dynamically generated application function-specific UEId for the AF 126 and the user endpoint device on which the AC 130 resides (UE_External_Id) in the UDR 106 (e.g., via a Nudr_DataRepository_PUT service operation).

Once the UDR 106 acknowledges storage of the dynamically generated application function-specific UEId for the AF 126 and the user endpoint device on which the AC 130 resides (UE_External_Id) (e.g., via a Nudr_DataRepository_PUT response message), the UDM/AUMF 104 may send the dynamically generated application function-specific UEId for the AF 126 and the user endpoint device on which the AC 130 resides (UE_External_Id) to the NEF 112 (e.g., via a Nudm_SDM_POST_Retrieve response message). The NEF 112 may then forward the dynamically generated application function-specific UEId for the AF 126 and the user endpoint device on which the AC 130 resides (UE_External_Id) to the AC 130 (e.g., via a Nnef_UEId_POST_Retrieve response message).

The AF 126 may then proceed accordingly using the application function-specific UEId.

Figure 3:
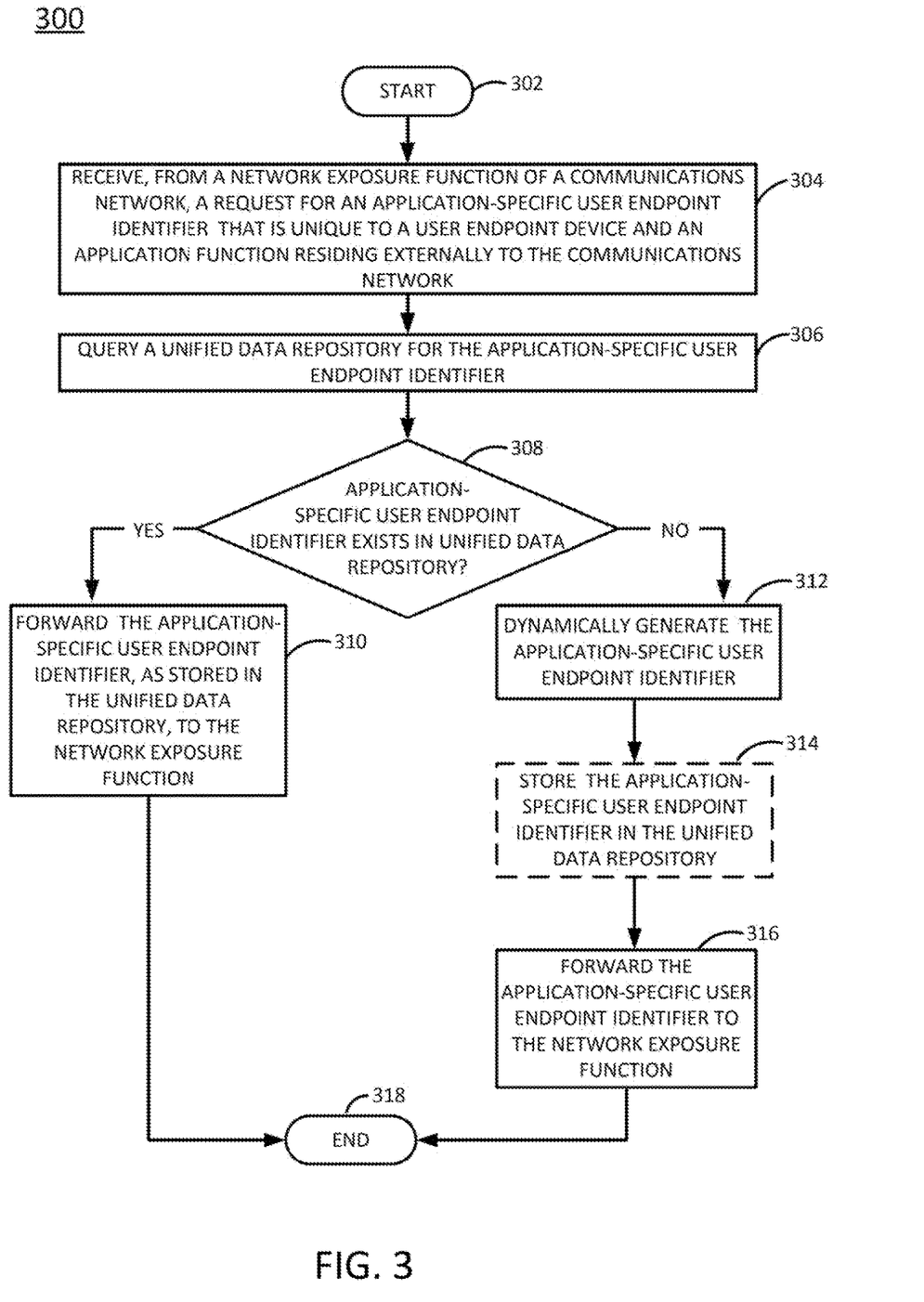
FIG. 3 illustrates a flowchart of an example method for dynamically generating an application function-specific user endpoint identifier.

FIG. 3 illustrates a flowchart of an example method 300 for dynamically generating an application function-specific user endpoint identifier (UEId). In one example, the method 300 may be performed by the UDM/AUMF 104 illustrated in FIGS. 1 and 2. However, in other examples, the method 300 may be performed by another device, such as the computing system 500 of FIG. 5, discussed in further detail below. For the sake of discussion, the method 300 is described below as being performed by a processing system (where the processing system may comprise a component of the UDM/AUMF 104, the computing system 500, or another device).

The method 300 begins in step 302. In step 304, the processing system may receive, from a network exposure function of a communications network, a request for an application function-specific user endpoint identifier that is unique to a user endpoint device and an application function residing externally to the communications network (which may communicate with an application client residing locally on the user endpoint device).

In one example, the user endpoint device may comprise a mobile device (e.g., a mobile phone, a tablet computer, a wearable device, or the like). The application function may comprise a software application that is supported by a local application client communicating with a remote application server that resides externally to the communications network. In one example, the request from the network exposure function may be received upon a first time that the user endpoint device executes or launches the software application.

As discussed above, the application function-specific UEId may be an identifier (e.g., an external identifier) that is unique to the combination of the user endpoint device and the application function residing externally to the communications network. That is, each application function with which the user endpoint device communicates may be associated with a different application function-specific UEId. Moreover, other instances of the application function communicating with other user endpoint devices may be associated with different application function-specific UEIds that are unique to those other user endpoint devices.

In one example, the request from the network exposure function may specify at least an identifier associated with the application function (AF_Id) and a unique identifier or UEId associated with the SIM card of the user endpoint device, such as a subscription permanent identifier (SUPI).

In step 306, the processing system may query a unified data repository for the application function-specific user endpoint identifier. In one example, the processing system may specify the identifier associated with the application function (e.g., AF_Id) and the unique identifier associated with the SIM card of the user endpoint device (e.g., SUPI). The AF_Id and the SUPI may be indexed to an application function-specific UEId in the unified data repository, if an application function-specific UEId has previously been provisioned for the AF_Id and the SUPI.

In step 308, the processing system may determine, based on a response from the unified data repository, whether the application function-specific user endpoint identifier exists in the unified data repository. For instance, if the application function-specific UEId has already been provisioned and exists in the unified data repository at the time of the query, then the unified data repository may respond to the query with the application function-specific UEId. However, if the application function-specific UEId has not been provisioned (or has been provisioned but then subsequently deleted by a user) and does not exist in the unified data repository at the time of the query, then the unified data repository may respond to the query with a NULL response.

If the processing system concludes, in step 308, that the application function-specific user endpoint identifier does exist in the unified data repository, then the method 300 may proceed to step 310. In step 310, the processing system may forward the application function-specific user endpoint identifier, as stored in the unified data repository, to the network exposure function.

In one example, the application function-specific UEId comprises an external identifier for the UE. The processing system may retrieve the external identifier from the unified data repository and forward the external identifier to the network exposure function.

If, on the other hand, the processing system concludes in step 308 that the application function-specific user endpoint identifier does not exist in the unified data repository, then the method 300 may proceed to step 312. In step 312, the processing system may dynamically generate the application function-specific user endpoint identifier.

In one example, the processing system dynamically generates the application function-specific UEId in the form of an external identifier. In one example, the application function-specific UEId may be generated according to any known method for generating application function-specific UEIds.

In optional step 314 (illustrated in phantom), the processing system may store the application function-specific user endpoint identifier in the unified data repository. Thus, the next time the application function-specific UEId is required by the application function, the application specific UEId can be retrieved from the unified data repository.

In step 316, the processing system may forward the application function-specific user identifier, as dynamically generated by the processing system, to the network exposure function. For instance, the processing system may forward the UEId in the form of an external identifier to the network exposure function.

Having forwarded either an application function-specific user endpoint identifier previously stored in the unified data repository (e.g., as in step 310) or a dynamically generated application function-specific user endpoint identifier (e.g., as in steps 312-316) to the network exposure function, the method 300 may end in step 318.

Although not expressly specified above, one or more steps of the method 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Thus, examples of the present disclosure provide an application function-specific UEId management function that can generate application function-specific UEIds on the fly for application functions and user endpoints. The disclosed approach circumvents the generation of errors when application function-specific UEIds are not provisioned in advance and/or when users have deleted previously generated application function-specific UEIds. The disclosed management function may utilize GPSIs in the form of external identifiers (e.g., as defined by 3GPP) in order to uniquely and anonymously identify user endpoints. The GPSIs are specific to given application functions in order to prevent the user endpoints behavior from being tracked across application functions.

Examples of the present application function-specific UEId management function may be extended to enable further functionalities, including allowing users to manage (e.g., view and/or delete) application function-specific UEIds associated with the users' user endpoint devices.

In another example, the present application function-specific UEId management function may allow a third party application that receives a user's MSISDN to exchange the MSISDN with an application-function specific static UEId over a NEF application programming interface (API), where the NEF API may in turn use the present application function-specific UEId management function on a southbound operation. The third party application in this case may prefer not to use MSISDN to target a user over the NEF API. For instance, an MSISDN change operation requested by the user may not be known to third party applications, and, as a result, any subsequent API calls onto a 3GPP network after a change in MSISDN may target the wrong user (to whom the MSISDN may have been reassigned).

However, a third party application that has received the MSISN from the user can subscribe to NEF notifications for MSISDN change events for a user who is identified by an application function-specific static UEId. Thus, the third party application will no longer be in the dark if/when the user changes the MSISDN without letting the third party application know about the change. In one example, a new NEF event type for a change in MSISDN can be enabled through the usage of an UMF API notification service. In this case, the AUMF may only notify (through the NEF) the application functions that have been identified and authorized by the user to receive MSISDN changes.

Figure 4:
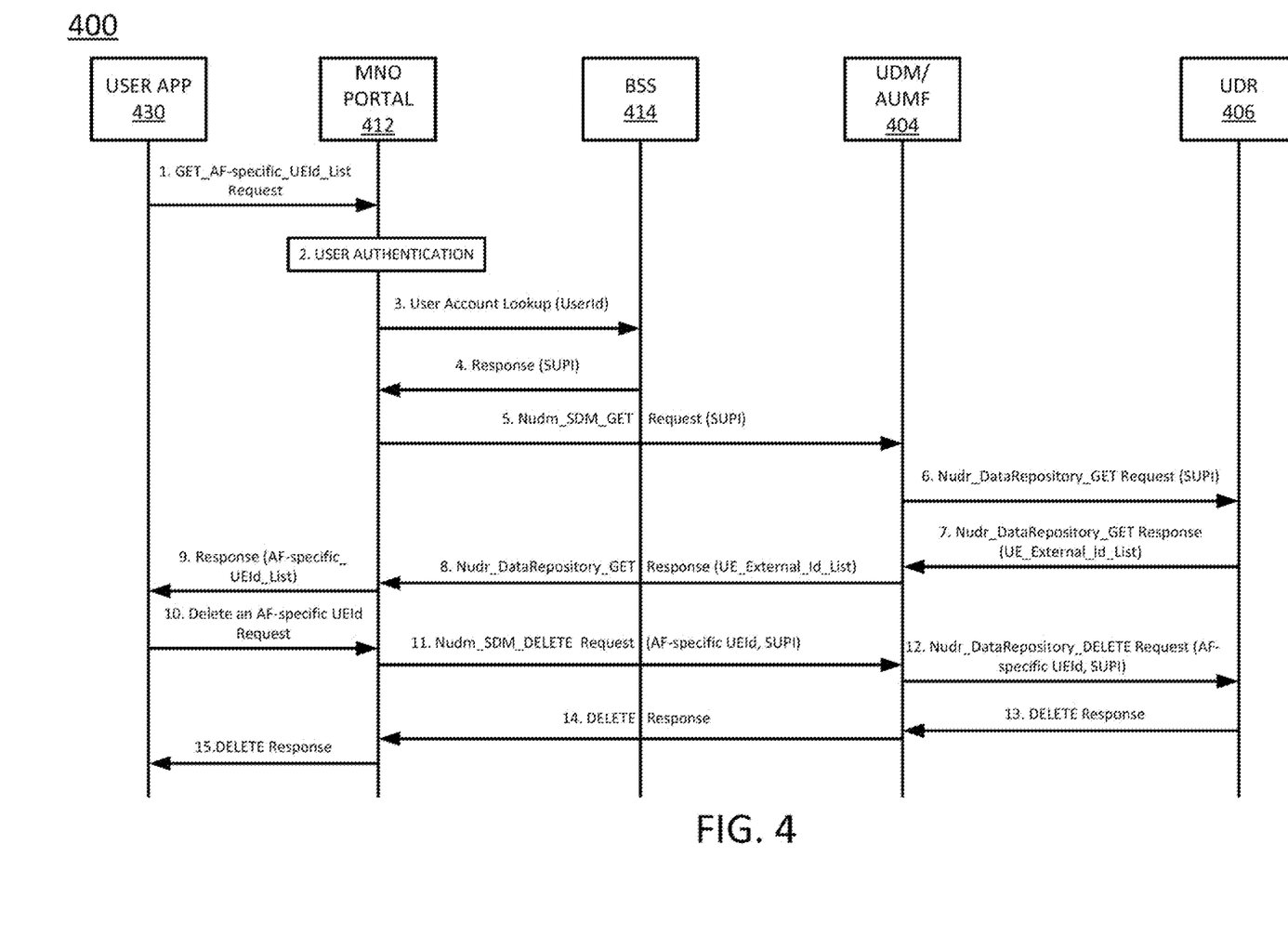
FIG. 4 illustrates call flow diagram that shows a view of operations of a user application, a mobile network operator portal, a basic service set, a unified data management element/application function-specific user endpoint identifier management function, and a unified data repository.

FIG. 4 illustrates call flow diagram 400 that shows a view of operations of a user application (APP) 430, a mobile network operator (MNO) portal 412, a basic service set (BSS) 414, a unified data management (UDM) element/application function-specific UEId management function (AUMF) 404, and a unified data repository (UDR) 406. In particular, FIG. 4 illustrates the process by which an application function-specific UEId for a user application 430 may be deleted from the UDR 406.

As illustrated in FIG. 4, the user application 430 may send a request message (GET_AF-specific_UEId_List Request) to the MNO portal 412. The request message may request a list of application function-specific UEIds.

The MNO portal 412 may authenticate the user associated with the user application 430, and, assuming that the user is authenticated, may subsequently perform a user account lookup in the BSS 414. The MNO portal may use a UserId associated with the user of the user application 430 to perform the user account lookup.

The BSS 414 may return a response to the MNO portal 412 in response to the user account lookup. The response from the BSS 414 may include a SUPI associated with a user endpoint device on which the user application 430 resides.

Once the MNO portal 412 has the SUPI of the user endpoint device, the MNO portal 412 may send a subscriber data management request to the UDM/AUMF 404. The subscriber data management request may include the SUPI and may request a list of external identifiers associated with the SUPI.

Once the UDM/AUMF 404 has the SUPI, the UDM/AUMF 404 may use the SUPI to query the UDR 406. For instance, the SUPI may be indexed in the UDR 406 to a list of external identifiers associated with the user endpoint device on which the user application 430 resides. The UDR 406 may return this list of external identifiers (UE_External_Id_List) to the UDM/AUMF 404.

The UDM/AUMF 404 may forward the list of external identifiers (UE_External_Id_List) to the MNO portal 412. Based on the list of external identifiers, the MNO portal 412 may return a list of application function-specific UEIds for the user endpoint device (AF-specific_UEId_List) to the user application 430.

The user application 430 may, under the direction of a human user, request deletion of at least one selected application function-specific UEId in the list of application function-specific UEIds. The request for deletion may be sent by the user application 430 to the MNO portal 412.

The MNO portal 412 may send a request to delete the selected application function-specific UEId(s) (Nudm_SDM_DELETE Request) to the UDM/AUMF 404. The request to delete the selected application function-specific UEId(s) may specify the selected application function-specific UEId(s) to be deleted and the SUPI associated with the user endpoint device on which the user application 430 resides.

The UDM/AUMF 404 may send a request to delete the selected application function-specific UEId(s) from the UDR 406 (Nudr_DataRepository_DELETE Request) to the UDR 406. The request to delete the selected application function-specific UEId(s) from the UDR 406 may specify the selected application function-specific UEId(s) to be deleted and the SUPI associated with the user endpoint device on which the user application 430 resides.

The UDR 406 may send a response to the UDM/AUMF 404 indicating that the selected application function-specific UEId(s) have been deleted from the UDR 406. The UDM/AUMF 404 may forward the response indicating that the selected application function-specific UEId(s) have been deleted from the UDR 406 to the MNO portal 412, which may, in turn, forward the response to the user application 430.

Thus, the MNO portal 412 and BSS 414 may utilize the available APIs of the AUMF portion of the UDM/AUMF 404 (e.g., operations such as GET and DELETE) in order to provide a means for users to easily view and remove any application function-specific UEIds assigned to the user's user endpoint device from the UDR 406.

Figure 5:
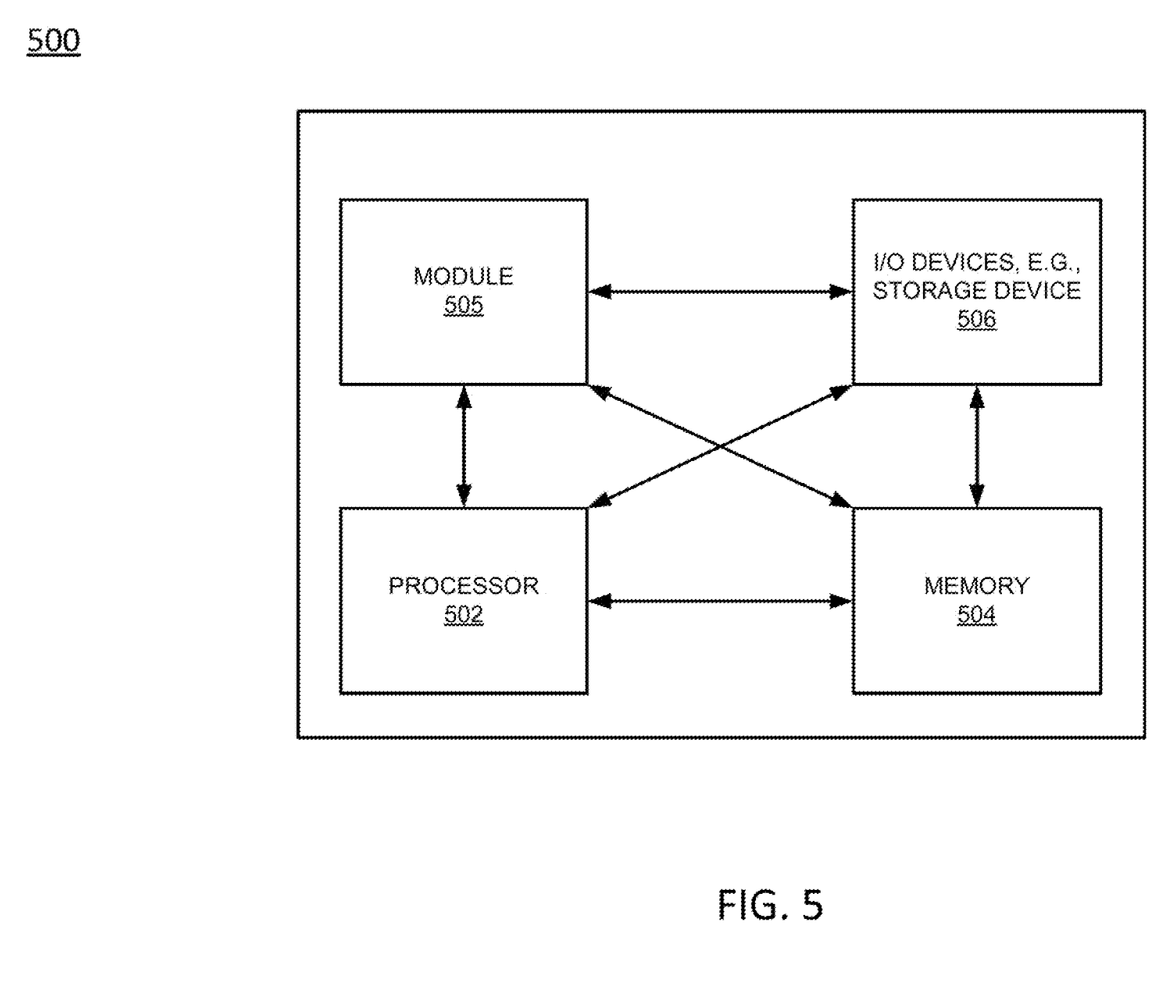
FIG. 5 depicts a high-level block diagram of a computing device specifically programmed to perform the functions described herein.

FIG. 5 depicts a high-level block diagram of a computing device specifically programmed to perform the functions described herein. For example, any one or more components or devices illustrated in FIG. 1 or described in connection with the method 300 may be implemented as the system 500. For instance, the UDM/AUMF 104 of FIG. 1 (such as might be used to perform the method 300) could be implemented as illustrated in FIG. 5. In another example, the NEF 112, the BSF 114, and/or one of the user endpoint devices 108 or 110 of FIG. 1 could be implemented as illustrated in FIG. 5.

As depicted in FIG. 5, the system 500 comprises a hardware processor element 502, a memory 504, a module 505 for dynamically generating an application function-specific user endpoint identifier, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for dynamically generating an application function-specific user endpoint identifier may include circuitry and/or logic for performing special purpose functions relating to estimating available bandwidth ranges and/or modifying settings for data transfers according to available bandwidth ranges. The input/output devices 506 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for dynamically generating an application function-specific user endpoint identifier (e.g., a software program comprising computer-executable instructions) can be loaded into memory 504 and executed by hardware processor element 502 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for dynamically generating an application function-specific user endpoint identifier (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
receiving, from a network exposure function of a communications network by a processing system including at least one processor, a request for an application function-specific user endpoint identifier that is unique to a user endpoint device and an application function residing externally to the communications network;
querying, by the processing system, a unified data repository for the application function-specific user endpoint identifier;
determining, by the processing system based on a response from the unified data repository, whether the application function-specific user endpoint identifier exists in the unified data repository;
dynamically generating, by the processing system, the application function-specific user endpoint identifier; and
forwarding, by the processing system, the application function-specific user identifier, as dynamically generated, to the network exposure function.

2. The method of claim 1, wherein the user endpoint device comprises a mobile device.

3. The method of claim 1, wherein the application function is one of a plurality of application functions with which the user endpoint device communicates, and each application function of the plurality of application functions is associated with a different application function-specific user endpoint identifier.

4. The method of claim 1, wherein the request specifies at least an identifier associated with the application function and a unique identifier associated with a subscriber identity module card of the user endpoint device.

5. The method of claim 4, wherein the unique identifier comprises a subscription permanent identifier.

6. The method of claim 4, wherein the querying attempts to index the identifier associated with the application function and the unique identifier associated with the subscriber identity module card of the user endpoint device to the application function-specific user endpoint identifier.

7. The method of claim 4, wherein the network exposure function acquires the unique identifier associated with the subscriber identity module card of the user endpoint device from a binding support function of the communications network.

8. The method of claim 7, wherein the binding support function indexes the unique identifier associated with the subscriber identity module card of the user endpoint device to an internet protocol address of the user endpoint device.

9. The method of claim 1, wherein the determining comprises receiving a null response from the unified data repository to the querying.

10. The method of claim 9, wherein the null response is an indication that the application function-specific user endpoint identifier has either not been provisioned previously or has been provisioned but subsequently deleted by a user.

11. The method of claim 1, wherein the application function-specific user endpoint identifier is an external identifier.

12. The method of claim 1, further comprising:
storing, by the processing system, the application function-specific user endpoint identifier, as dynamically generated, in the unified data repository.

13. The method of claim 1, wherein the communications network is a fifth generation mobile network.

14. The method of claim 1, wherein the processing system is part of a unified data management element of the communications network.

15. The method of claim 14, wherein the unified data management element comprises an application function-specific user endpoint identifier management function.

16. A non-transitory computer-readable medium storing instructions which, when executed by a processing system including at least one processor, cause the processing system to perform operations, the operations comprising:
receiving, from a network exposure function of a communications network, a request for an application function-specific user endpoint identifier that is unique to a user endpoint device and an application function residing externally to the communications network;
querying a unified data repository for the application function-specific user endpoint identifier;
determining, based on a response from the unified data repository, whether the application function-specific user endpoint identifier exists in the unified data repository;
dynamically generating the application function-specific user endpoint identifier; and
forwarding the application function-specific user identifier, as dynamically generated, to the network exposure function.

17. The non-transitory computer-readable medium of claim 16, wherein the request specifies at least an identifier associated with the application function and a unique identifier associated with a subscriber identity module card of the user endpoint device.

18. The non-transitory computer-readable medium of claim 17, wherein the unique identifier comprises a subscription permanent identifier.

19. The non-transitory computer-readable medium of claim 16, wherein the operations further comprise:
storing the application function-specific user endpoint identifier, as dynamically generated, in the unified data repository.

20. A system comprising:
a processing system including at least one processor; and
a non-transitory computer-readable medium storing instructions which, when executed by the processing system, cause the processing system to perform operations, the operations comprising:
receiving, from a network exposure function of a communications network, a request for an application function-specific user endpoint identifier that is unique to a user endpoint device and an application function residing externally to the communications network;
querying a unified data repository for the application function-specific user endpoint identifier;
determining, based on a response from the unified data repository, whether the application function-specific user endpoint identifier exists in the unified data repository;
dynamically generating the application function-specific user endpoint identifier; and
forwarding the application function-specific user identifier, as dynamically generated, to the network exposure function.

* * * * *